(12) United States Patent
Clediere et al.

(10) Patent No.: US 10,303,332 B2
(45) Date of Patent: May 28, 2019

(54) PRESENTING INTERACTIONS WITH CONTENT ON A SOCIAL NETWORKING SYSTEM IN REAL TIME THROUGH ICONS

(71) Applicant: Facebook, Inc., Menlo Park, CA (US)

(72) Inventors: Robin Maxime Clediere, San Francisco, CA (US); Samantha P. Krug, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 175 days.

(21) Appl. No.: 15/243,913

(22) Filed: Aug. 22, 2016

(65) Prior Publication Data
US 2018/0052570 A1 Feb. 22, 2018

(51) Int. Cl.
*G06Q 50/00* (2012.01)
*G06F 3/0482* (2013.01)
*G06F 3/0481* (2013.01)
*G06F 3/0485* (2013.01)
*H04L 12/58* (2006.01)
*H04L 29/08* (2006.01)
*H04L 29/06* (2006.01)

(52) U.S. Cl.
CPC ........ *G06F 3/0482* (2013.01); *G06F 3/04817* (2013.01); *G06F 3/04855* (2013.01); *G06Q 50/01* (2013.01); *H04L 51/32* (2013.01); *H04L 51/34* (2013.01); *H04L 67/02* (2013.01); *H04L 67/10* (2013.01); *H04L 67/38* (2013.01)

(58) Field of Classification Search
CPC .............. G06F 3/04817; G06F 3/0482; G06F 3/04855; H04L 67/02; H04L 67/10; H04L 51/32; H04L 51/34; H04L 67/38; G06Q 50/01
See application file for complete search history.

(56) References Cited

U.S. PATENT DOCUMENTS

| | | | |
|---|---|---|---|
| 5,479,600 A | * | 12/1995 | Wroblewski et al. ...... G06F 3/04855 715/787 |
| 8,743,151 B1 | | 6/2014 | Fulcher et al. |
| 9,146,656 B1 | | 9/2015 | Srinivasan et al. |
| 2013/0326352 A1 | | 12/2013 | Morton |
| 2014/0059139 A1 | * | 2/2014 | Filev et al. ............ G06Q 50/01 709/205 |
| 2014/0068689 A1 | | 3/2014 | Sirpal et al. |
| 2015/0256415 A1 | * | 9/2015 | Williamson et al. ... H04L 67/02 709/223 |
| 2016/0269328 A1 | * | 9/2016 | Pola ...................... H04L 51/046 |

* cited by examiner

*Primary Examiner* — Aaron Lowenberger
(74) *Attorney, Agent, or Firm* — Fenwick & West LLP (57) ABSTRACT

Interactions with content on a social networking system are presented in real time using icons. Content items are presented to users of the social networking system by the social networking system. The social networking system receives interactions with a content item from users of the social networking system. In some embodiments, the interactions comprise users liking the content item, posting a comment on the content item, and sharing the content item with other users. Icons are displayed to users describing an interaction with a content item. The icon may comprise information about the type of the interaction with the content item and which user performed the interaction. In some embodiments, icons are presented to users based on a measure of affinity of the user for the interaction. In some embodiments, a user can select the icon to see the interaction with the content item.

17 Claims, 8 Drawing Sheets

PRESENTING INTERACTIONS WITH CONTENT ON A SOCIAL NETWORKING SYSTEM IN REAL TIME THROUGH ICONS

BACKGROUND

This invention relates generally to social networking systems, and in particular to presenting interactions with content items in a social networking system in real time.

Social networking systems allow users to connect and interact with each other, and allow users to add and interact with content items stored by the social networking system. For example, users can interact with content on a social networking system by expressing approval of the content (e.g., "liking" the content item), adding additional content to the content item (e.g., posting a "comment" on the content item), and sharing the content item with other users of the social networking system.

Interactions with content items are often presented so that users can see how other users have interacted with the content. Users who have interacted with a content item may also be notified of other interactions with the same content item. However, users may not see interactions that would be of interest to them because the interactions of interest may be aggregated with other interactions or because the number of interactions with the content item is too large. In addition, a user may not see an interaction until long after the interaction occurred, thereby preventing the user from further interacting with the other user's interaction in a timely way.

SUMMARY

A social networking system provides real time interaction information for content items, permitting users to quickly identify when content items of interest are being viewed and interacted with by other users. The social networking system may also filter the user interactions to display those interactions most likely to be of interest to the user. A social networking system stores content items provided by users and displays those content items to other users in a newsfeed or in a view of the content item itself. Types of content items include any content stored by a social networking system, such as text, photos, videos, links, applications, pages, groups, and events. Content items are presented to users of the social networking system in various ways. In some embodiments, content items are presented to a user through a page in the social networking system for the content item, or as a story in a newsfeed.

The social networking system receives interactions with a content item from users of the social networking system. The various interactions can include users expressing approval of the content item (e.g. "liking" the content), associating other content items with the content item (e.g. posting a "comment" on the content), and sharing the content item with other users of the social networking system. After receiving an interaction with a content item, the social networking system displays icons to viewing users describing the interaction with a content item. In some embodiments, the icon includes information about the type of the interaction with the content item and which user performed the interaction. The icon may be presented to a viewing user proximate to the content item in a newsfeed or on a page for the content item in the social networking system. For a viewing user, the social networking system selects which interactions to display to the user and represent in the icon. In some embodiments, the interactions are selected based on a measure of affinity of the user for the interaction. The icon may display an aggregate of interactions with the content item of different types from different users. In addition, the icon may display a pending interaction or identify an interaction that is pending display to the user.

In one example embodiment for displaying interaction icons within a newsfeed of stories, a user may navigate the newsfeed by scrolling in the newsfeed or going to a particular location of the newsfeed. To illustrate the interaction with a content item that is not visible in a visible portion of the newsfeed, the icon displaying interactions with a content item may be displayed in a portion of a scrollbar of the newsfeed indicating at what portion of the scrollbar the content item related to the interaction is located.

In another example embodiment, when a user selects a content item in the newsfeed, the user may be directed to a page that displays only the selected content item and related interactions. Within this content page, an icon describing a new interaction with the content item may be displayed, and the viewing user may be able to select the icon to view the interaction represented by the icon.

BRIEF DESCRIPTION OF FIGURES

Figure (FIG. 1 shows a block diagram that illustrates an environment and architecture of a social networking system, according to some embodiments.

DETAILED DESCRIPTION

Figure 1:
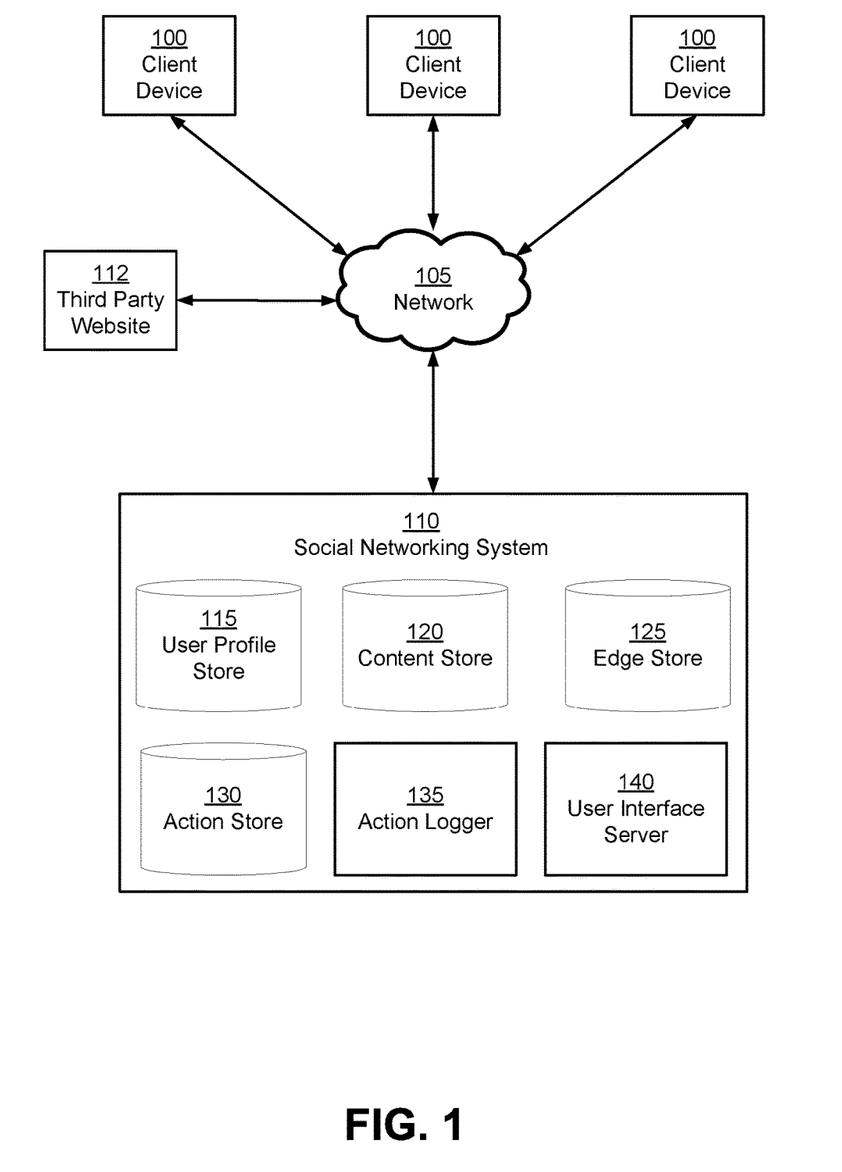

FIG. 1 is a block diagram of a system environment for a social networking system 110. The system environment shown by FIG. 1 comprises one or more client devices 100, a network 105, one or more third-party systems 112, and the social networking system 110. In alternative configurations, different and/or additional components may be included in the system environment. The embodiments described herein can be adapted to online systems that are not social networking systems.

The client devices 100 are one or more computing devices capable of receiving user input as well as transmitting and/or receiving data via the network 105. In one embodiment, a client device 100 is a conventional computer system, such as a desktop or laptop computer. Alternatively, a client device 100 may be a device having computer functionality, such as a personal digital assistant (PDA), a mobile telephone, a smartphone or another suitable device. A client device 100 is configured to communicate via the network 105. In one embodiment, a client device 100 executes an application allowing a user of the client device 100 to interact with the social networking system 110. For example, a client device 110 executes a browser application to enable interaction between the client device 100 and the social networking system 110 via the network 105. In another embodiment, a client device 100 interacts with the social networking system 110 through an application programming interface (API) running on a native operating system of the client device 100, such as IOS® or ANDROID™.

The client devices 100 are configured to communicate via the network 105, which may comprise any combination of local area and wide area networks employing wired or wireless communication links. In one embodiment, the network 105 uses standard communications technologies and protocols. For example, the network 105 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 105 may be represented using any suitable format, such as hypertext markup language (HTML) or extensible markup language (XML). In some embodiments, all or some of the communication links of the network 105 may be encrypted using any suitable technique or techniques.

One or more third party systems 112 may be coupled to the network 105 for communicating with the social networking system 110, which is further described below in conjunction with FIG. 1. In one embodiment, a third party system 112 is an application provider communicating information describing applications for execution by a client device 100 or communicating data to client devices 100 for use by an application executing on the client device. In other embodiments, a third party system 112 provides content or other information for presentation via a client device 100. A third party website 112 may also communicate information to the social networking system 110, such as advertisements, content, or information about an application provided by the third party website 112.

The social networking system 110 shown in FIG. 1 includes a user profile store 115, a content store 120, an action logger 125, an action store 130, an edge store 135, and a user interface server 140. In other embodiments, the social networking system 110 may include additional, fewer, or different components for various applications. Conventional components such as network interfaces, security functions, load balancers, failover servers, management and network operations consoles, and the like are not shown so as to not obscure the details of the system architecture.

Each user of the social networking system 110 is associated with a user profile, which is stored in the user profile store 205. A user profile includes declarative information about the user that was explicitly shared by the user and may also include profile information inferred by the social networking system 110. In one embodiment, a user profile includes multiple data fields, each describing one or more attributes of the corresponding user of the social networking system 110. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 110 displayed in an image. A user profile in the user profile store 115 may also maintain references to actions by the corresponding user performed on content items in the content store 120 and stored in the action store 130.

The content store 120 stores objects that each represent various types of content. Examples of content types represented by an object include a page post, a status update, a photograph, a video, a link, a shared content item, a gaming application achievement, a check-in event at a local business, a brand page, or any other type of content. Social networking system users may create objects stored by the content store 120, such as status updates, photos tagged by users to be associated with other objects in the social networking system, events, groups or applications. In some embodiments, objects are received from third-party applications or third-party applications separate from the social networking system 110. In one embodiment, objects in the content store 120 represent single pieces of content, or content "items." Hence, users of the social networking system 110 are encouraged to communicate with each other by posting content items of various types of media through various communication channels. This increases the amount of interaction of users with each other and increases the frequency with which users interact within the social networking system 110.

The action logger 125 receives communications about user actions internal to and/or external to the social networking system 110, populating the action store 130 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action store 130.

The action store 130 may be used by the social networking system 110 to track user actions on the social networking system 110, as well as actions on third party systems 112 that communicate information to the social networking system 110. Users may interact with various objects on the social networking system 110, and information describing these interactions is stored in the action log 120. Examples of interactions with objects include: commenting on posts, sharing links, and checking-in to physical locations via a mobile device, accessing content items, and any other interactions. Additional examples of interactions with objects on the social networking system 110 that are included in the action store 130 include commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action store 130 may record a user's interactions with advertisements on the social networking system 110 as well as with other applications operating on the social networking system 110. In some embodiments, data from the action store 130 is used to infer interests or preferences of a user, augmenting the interests included in the user's user profile and allowing a more complete understanding of user preferences.

The action store 130 may also store user actions taken on a third party system 112, such as an external website, and communicated to the social networking system 110. For example, an e-commerce website that primarily sells sporting equipment at bargain prices may recognize a user of a social networking system 110 through a social plug-in enabling the e-commerce website to identify the user of the social networking system 110. Because users of the social networking system 110 are uniquely identifiable, e-commerce websites, such as this sporting equipment retailer, may communicate information about a user's actions outside of the social networking system 110 to the social networking system 110 for association with the user. Hence, the action store 130 may record information about actions users perform on a third party system 112, including webpage viewing histories, advertisements that were engaged, purchases made, and other patterns from shopping and buying.

In one embodiment, an edge store 135 stores information describing connections between users and other objects on the social networking system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 110, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 110, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 135 also stores information about edges, such as affinity scores for objects, interests, and other users. Affinity scores, or "affinities," may be computed by the social networking system 110 over time to approximate a user's affinity for an object, interest, and other users in the social networking system 110 based on the actions performed by the user. A user's affinity may be computed by the social networking system 110 over time to approximate a user's affinity for an object, interest, and other users in the social networking system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 135, in one embodiment. Alternatively, each interaction between a user and a specific object is stored as a separate edge. In some embodiments, connections between users may be stored in the user profile store 115, or the user profile store 115 may access the edge store 135 to determine connections between users.

The user interface server 140 links the social networking system 110 via the network 105 to the one or more client devices 100, as well as to the one or more third party systems 112. The user interface server 140 serves web pages, as well as other web-related content, such as JAVA®, FLASH®, XML and so forth. The user interface server 140 may receive and route messages between the social networking system 110 and the client device 100, for example, instant messages, queued messages (e.g., email), text messages, short message service (SMS) messages, or messages sent using any other suitable messaging technique. A user may send a request to the user interface server 140 to upload information (e.g., images or videos) that are stored in the content store 120. Additionally, the user interface server 140 may provide application programming interface (API) functionality to send data directly to native client device operating systems, such as IOS®, ANDROID™, WEBOS® or RIM®.

The user interface server 140 generates user interfaces, such as web pages, with content from the social networking system 110. The user interfaces are displayed to the user through a client device 100 and network 105. The user interfaces provided by the user interface server 140 allows a user to generate content items and interact with content items stored by the content store 120. For example, a user interface may provide a method for a user provide text, pictures, videos, links, and advertisements to be used to generate content items. The user interface server 140 configures a user interface based on the client device 100 used to present it. For example, a user interface for a smartphone with a touchscreen may be configured differently from a user interface for a web browser on a computer.

The user interface server 140 receives information from the action logger 135 about a user interacting with a content item. Upon receiving information about an interaction with a content item, the user interface server 140 identifies other users viewing the content item and displays icons to the users viewing the content item describing the interaction. The user viewing a content item is also termed the viewing user. In some embodiments, the icons identify the user who performed the interaction and the type of the interaction. The icons may be shown to a viewing user based on a measure of affinity of the viewing user for the interaction, which may be determined based on the affinity of the viewing user to various features of the interaction. The measure of affinity for an interaction may be based on the viewing user's affinity for the user who performed the action, the user who generated or posted the content item, the content item, and the type of interaction itself. Icons of interactions with a content item are discussed further with FIG. 3-8.

Method for Presenting Icons of Interactions to Users

Figure 2:
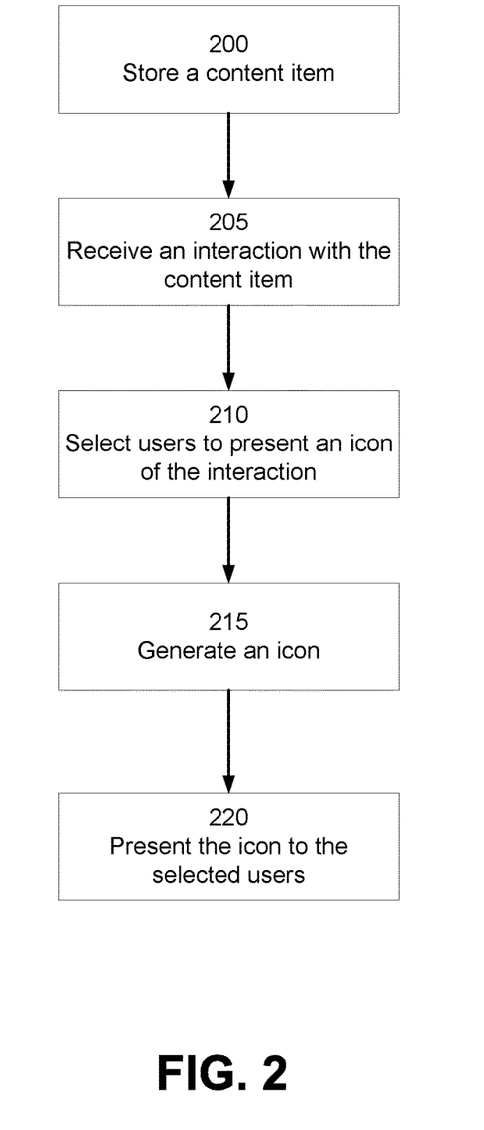
FIG. 2 shows a flowchart that illustrates a method for presenting icons describing new interactions with content, according to some embodiments.

FIG. 2 shows a flowchart that illustrates a method for presenting icons describing new interactions with content, according to some embodiments. In other embodiments, the method may include different and/or additional steps than those shown in FIG. 2. Additionally, steps of the method may be performed in different orders than the order described in conjunction with FIG. 2 in various embodiments.

The social networking system stores a content item 200. The content item can contain various content types such as text, pictures, videos, links, applications, advertisements, and events as discussed above. The social networking system receives an interaction with the content item 205. Examples of interactions include a user liking the content item, commenting on the content item, and sharing the content item. The social networking system selects users to whom it will present an icon of the interaction 210. First, the social networking system determines users that are presently viewing the content item, such that the content item is present in a newsfeed viewed by the users, or the user is viewing a page of the content item itself. In some embodiments, from among the users viewing the content item, information about the interaction may be provided to some, but not all of those users. For example, the social networking system may select users based on measures of affinity of the users for the interaction. In some embodiments, the social networking system selects users who are viewing a page for the content item. The social networking system generates 215 and presents icons to the selected users 220 describing the interaction. The icons can contain information identifying the type of the interaction and the user who performed the interaction. In some embodiments, icons are displayed with the content item as a story in a newsfeed or on a page for the content item. In some embodiments, interactions are aggregated into one icon when multiple interactions of the same type are performed close in time to one another. These various interactions are described more fully with respect to FIGS. 3-8.

By presenting icons to a viewing user describing interactions with a content item, the user is alerted to an interaction when the interaction takes place. This brings interactions to the user's attention that they may otherwise miss, and allows interacting with a content item to be a method for real-time communication between users.

Examples of User Interfaces with Interaction Icons

Figure 3:
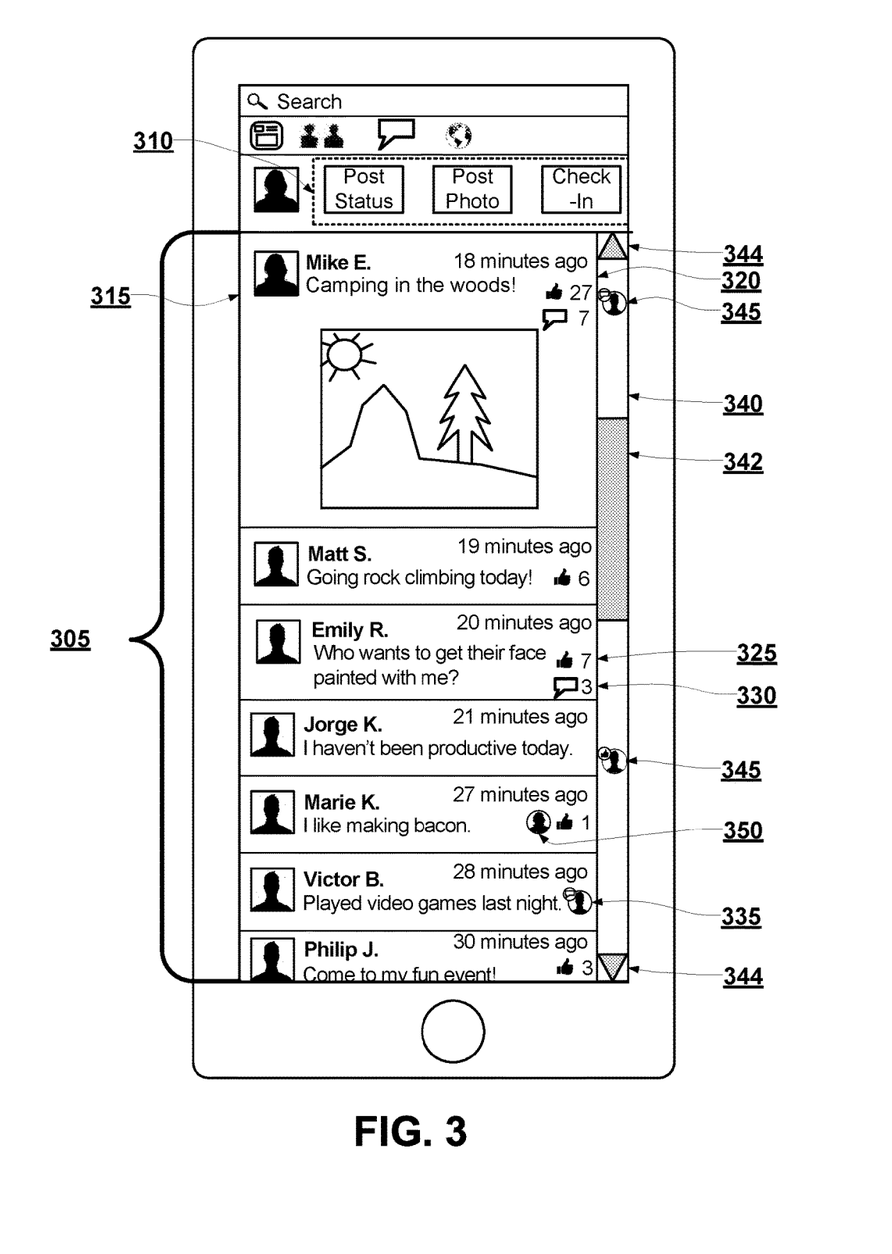
FIG. 3 illustrates an example user interface with a newsfeed in a social networking system, according to some embodiments.

FIG. 3 illustrates an example user interface with a newsfeed in a social networking system, according to some embodiments. A newsfeed displays a set of content items 305 as stories to a viewing user. Each content item may be displayed in full in the newsfeed, or only a portion of the content item may be displayed. The set of content items 305 may be selected by the social networking system for the viewing user based on the viewing user's affinity for the various content items, recency of the content items, other user's interactions with the content items, and other factors that may indicate an interest of the viewing user in the content item for selecting the content item from among all content items of the social networking system. In some embodiments, a user interface element allows users to generate new content items, such as the buttons provided 310 that allow the user to post a status, post a photo, or display their location to other users (i.e. "check-in" at a location). Content item 315 displays a picture posted by a user of the social networking system. In the embodiment illustrated in FIG. 3, the contents of the content item are displayed and the user who generated the content item is identified. The viewing user may be able to select a content item to view a page for the content item with information about the content item and the interactions with the content item. FIGS. 4-8 describe a page for a content item in further detail, according to some embodiments. Content items are displayed with a timestamp 320 that shows when the content item was generated and are also displayed with information about how users have interacted with the content item. In the embodiment illustrated in FIG. 3, a content item is displayed with the number of users who have liked the content item 325 and the users who have commented on the content item 330.

The newsfeed may include more content items than can be displayed to a user at a given time in the display. To navigate among the content items, the display may include a scroll bar 340 including a slider 342 and buttons 344. The position of the slider 342 in the scroll bar indicates the portion of the newsfeed being displayed, and the user may select the slider 342 and move the slider 342 to another portion of the scroll bar 340 to view that portion of the newsfeed. The buttons 344 may also be used to navigate upwards or downwards in the newsfeed.

When the social networking system receives a new interaction with a content item, an icon describing the interaction is displayed to a viewing user. In the embodiment illustrated in FIG. 3, an icon is displayed with information about the type of the interaction and information identifying the user who performed the interaction. The icon can be displayed near/next to the content item with which the interaction took place as shown by icon 335. Alternatively, the icon may be displayed in the scroll bar 340 to indicate the location of the content item within the newsfeed associated with the icon (i.e., the content item that was affected by the interaction). The icon on the scrollbar may indicate to the user that there is a notification at that portion of the newsfeed accessible by navigating to that portion of the scrollbar 340. In the latter embodiments, if the viewing user scrolled through the newsfeed to the location of the scroll bar 340 indicated by the icon 345, the viewing user would see the content item and the interaction associated with the icon 345. In some embodiments, selecting the icon 345 on the scroll bar 340 moves the display of the newsfeed to the location of the content item in the newsfeed. In some embodiments, selecting an icon takes the viewing user to a page for the content item and displays the interaction associated with the icon. In some examples, the icon 355 next to a content item 335 is only shown if the viewing user is presently viewing the content item in the newsfeed 305 at the time the interaction takes place. In some embodiments, an icon is displayed to a user in the scroll bar 345 only if the viewing user is not presently viewing the content item in the newsfeed 305. In some embodiments, the icon is shown if a certain number of interactions have occurred in a certain period of time.

In some embodiments, an icon is displayed for a period of time, after which the icon is no longer displayed. In some of those embodiments, if an icon is displayed and another interaction occurs before the first icon disappears, a second icon describing the new interaction is displayed next to the first icon, and the period of time for the first icon is reset. In other embodiments, the first icon may be replaced by the second icon, or another icon may combine the different interactions.

In some embodiments, an icon is not always displayed when an interaction occurs related to a content item displayed in a newsfeed. To determine whether to display the interaction, the affinity of the viewing user to the interaction for the content item may be determined, and the interaction icon is displayed to the user based on the measure of affinity of the viewing user for the interaction. The measure of affinity can be determined based on the viewing user to whom the icon is displayed, the user who generated the content item, the user who performed the interaction, the type of the interaction, content associated with the interaction, or the content item. In some embodiments, the measure of affinity is based on whether the viewing user has previously interacted with the content item. In some embodiments, a threshold for the measure of affinity is used to determine whether to display an icon. In some embodiments, the threshold is different for determining whether to display the icon in the scroll bar 345 or next to the content item 335, for example so that a higher affinity threshold is set for content items not currently on the user's display.

In some embodiments, an icon 350 shows another user's presence on a content item. A user is present on a content item if the user is currently viewing a page for the content item. Users may use the presence icon 350 to determine whether other users are also viewing the content item, which may encourage engagement of users with the content item. In some embodiments, an icon showing a user's presence on a content item is only shown on a newsfeed next to a content item 335. In some embodiments, selecting a presence icon 350 showing a user's presence on a content item displays a page, such as a profile or feed, associated with the selected user to the viewing user. In some embodiments, an icon showing a user's presence on a content item is shown to a viewing user based a measure of affinity of the viewing user for the user. In some embodiment, an icon showing a user's presence on a content item is displayed while the user is viewing a page for the content item. If the user leaves the page, the icon is no longer shown.

Figure 4:
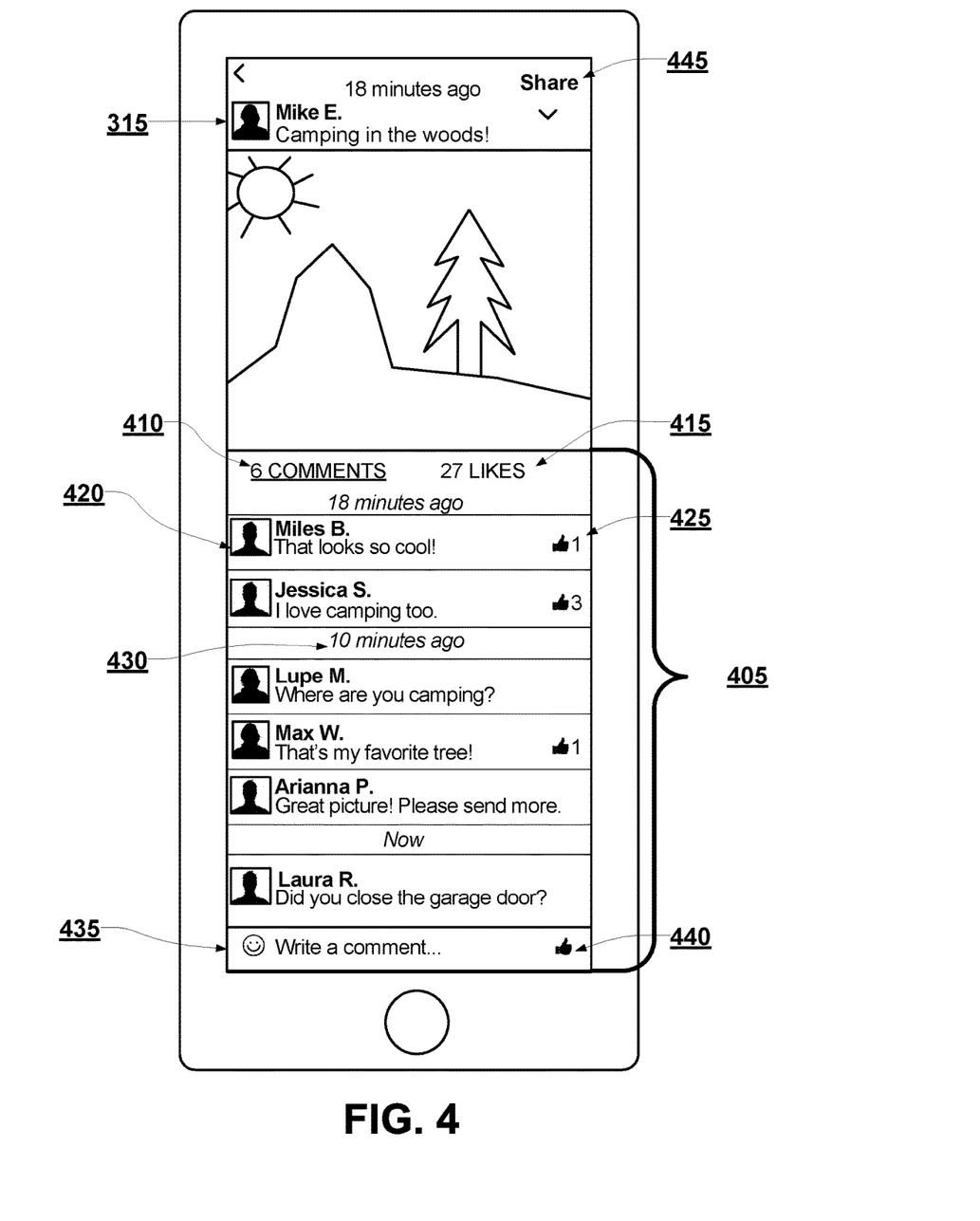
FIG. 4 illustrates an example user interface with a page for a content item with interactions, according to some embodiments.

FIG. 4 illustrates an example user interface with a page for a content item displaying interactions, according to some embodiments. The embodiment illustrated in FIG. 4 shows a page for a content item 315 from FIG. 3. The content item 315 is displayed and the user who generated the content item 315 is identified. Additional related content 405 added to the content item 315 may also be chronologically displayed on the page. In the embodiment illustrated in FIG. 4, the display includes the number of comments 410 and the number of likes 415 associated with the content. In some embodiments, other types of interactions with the content item 315, such as the number of times the content item 315 has been shared, are displayed as well. Comments 420 on the content item are displayed with information identifying the user who posted the comment. In some embodiments, users can interact with a content item 315 by interacting with comments that are posted on the content item 315. For example, users can like a comment on a content item 315, and the number of comment likes 425 may be shown with the comment. In some embodiments, users can interact with comments in other ways, such as replying to comments.

Comments are grouped based on timestamps 430 to designate the approximate times when the comments were posted. For example, users Miles B. and Jessica S. commented on the content item between 18 minutes ago and 10 minutes ago, and may be grouped between the 18 minute timestamp and the 10 minute timestamp. In some embodiments, recent comments are grouped under a timestamp stating "Now." Comments may be grouped under a "Now" timestamp if they posted recently (e.g. within 15 seconds, within 1 minute, etc.), or if they occurred since the page for the content item was presented for the user.

The page for the content item also allows users to interact with the content item 315. In the embodiment illustrated in FIG. 4, the page allows a user to write a new comment on the content item 435, to like the content item 440, or to share the content item 445, though other ways of interacting with the content item 315 may be available in other embodiments.

Figure 5:
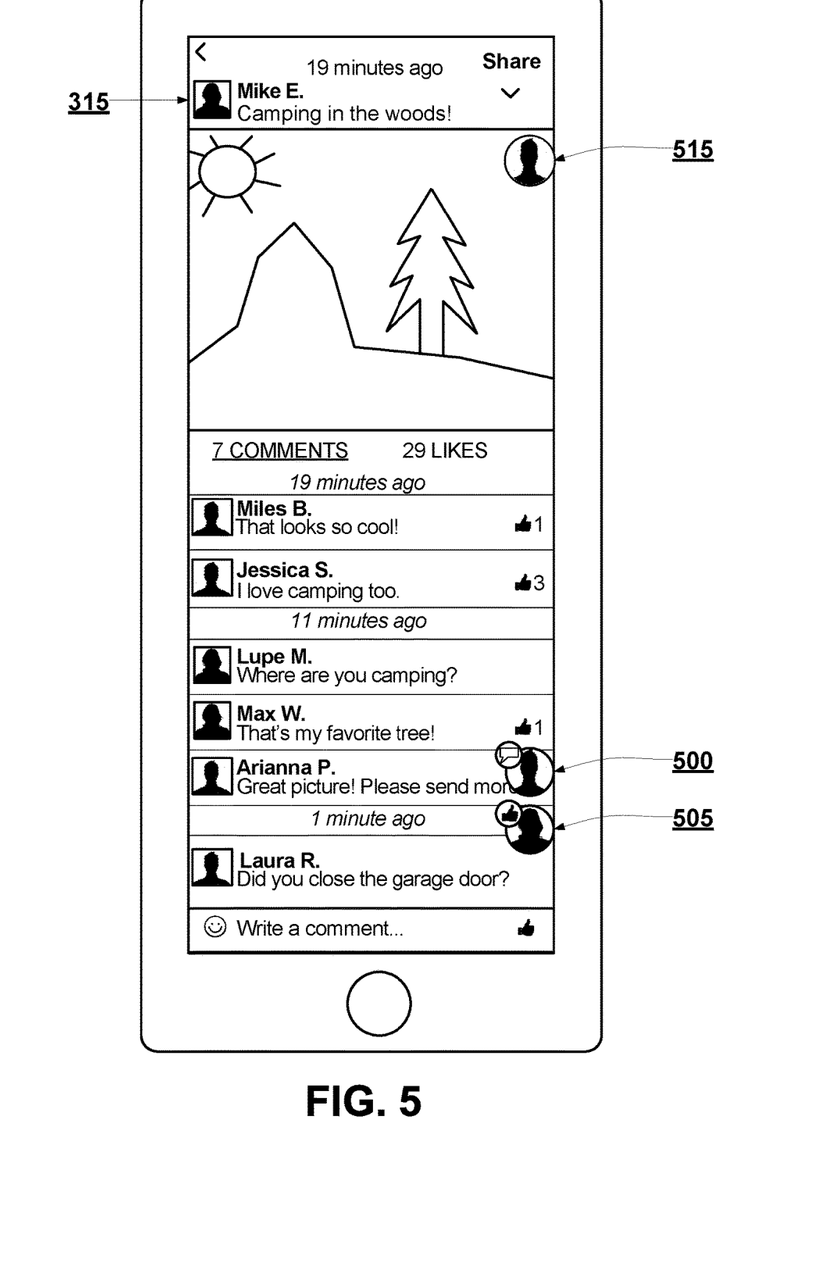
FIG. 5 illustrates an example user interface with a page for a content item showing icons that describe new interactions with the content item, according to some embodiments.

FIG. 5 illustrates the example user interface from FIG. 4 with icons that describe new interactions with the content item, according to some embodiments.

An icon 500 is shown to describe a new interaction with the content item 315. In the embodiment illustrated in FIG. 5, an icon is displayed with information about the type of the interaction (e.g. an image describing the interaction) and information identifying the user who performed the interaction (e.g. the profile picture for the user). For example, icon 500 illustrates a new comment on the content item 315 and icon 505 illustrates a new like on the content item 315. In some embodiments, an icon could represent multiple types of interactions from the same user. For example, if a user both commented on and liked a content item, a single icon with the user's profile picture may be shown, and the icon may have icons for both a like and a comment. In some embodiments, the icon provides a preview of the interaction when it appears. For example, the icon may display a speech bubble with the text of a new comment when it appears.

Icons are displayed to users who are viewing the page for the content item 315. In some embodiments, a threshold is used for a measure of affinity of the viewing user for the interaction to determine whether to display an icon. The threshold may be based on the number of previous interactions or the rate of interaction with the content item. For example, if there have been a large number of interactions within a short period of time, an icon may be shown to a viewing user for an interaction performed by a friend of the viewing user.

In some embodiments, an icon 515 shows another user's presence on a content item. A user is present on a content item if the user is currently viewing the page for the content item 315. An icon showing another user's presence on a content item is displayed while the other user is viewing a page for the content item. If the user leaves the page, the icon 515 is no longer shown. In some embodiments, an icon showing a user's presence on a content item is shown to a viewing user based a measure of affinity of the viewing user for the user. In some embodiments, selecting an icon showing a user's presence on a content item takes the selecting user to the user's profile page.

Figure 6:
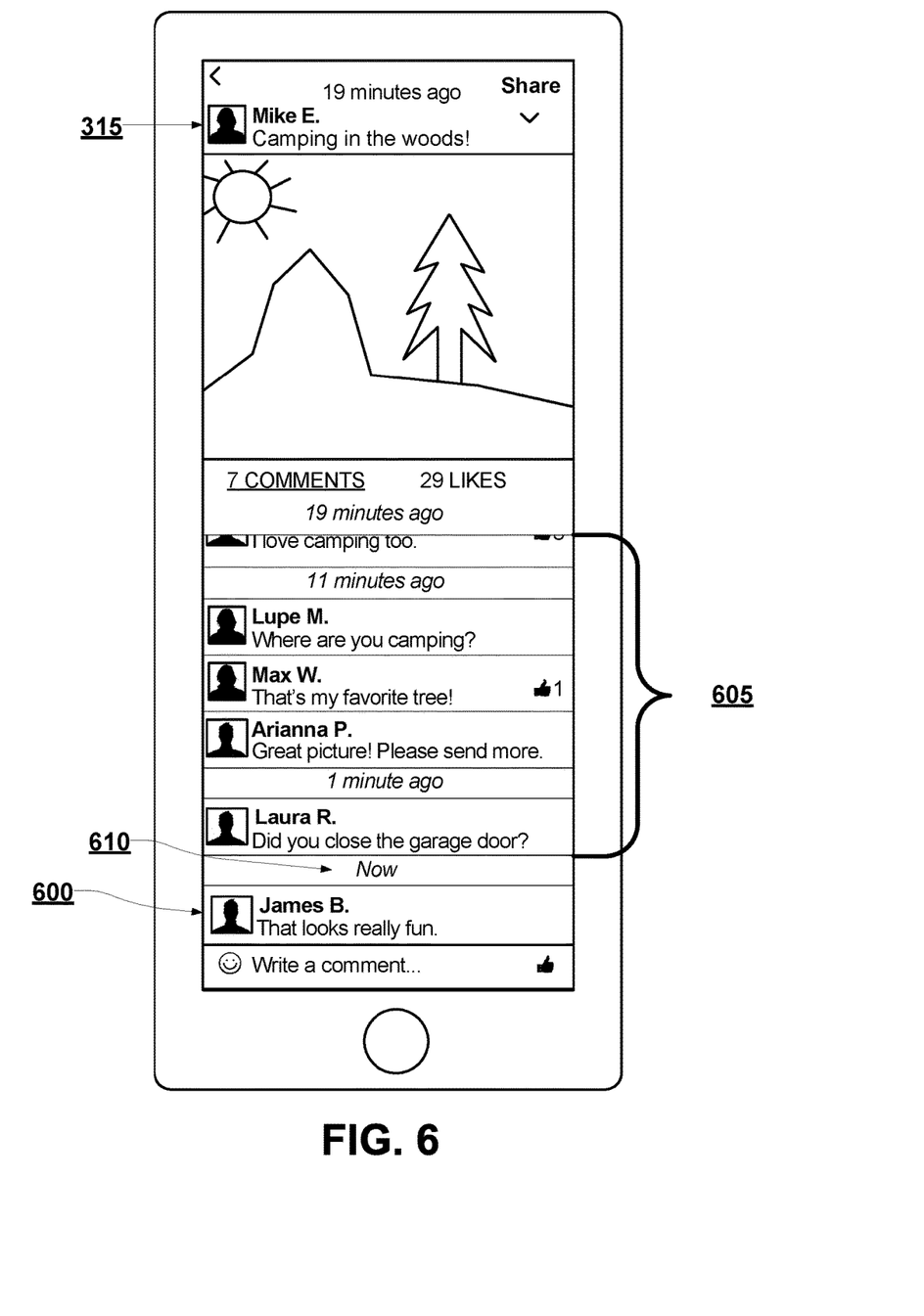
FIG. 6 illustrates an example user interface after the user selected an icon on a page for a content item, according to some embodiments.

In some embodiments, a user can select an icon describing an interaction to see the interaction associated with the icon. FIG. 6 illustrates an example user interface after the user selected an icon 500 associated with a comment on the content item, according to some embodiments. The user interface is updated to show the new comment 600 below the prior comments 605. The new comment is also grouped under a "Now" timestamp 610, indicating that the new comment happened recently.

Figure 7:
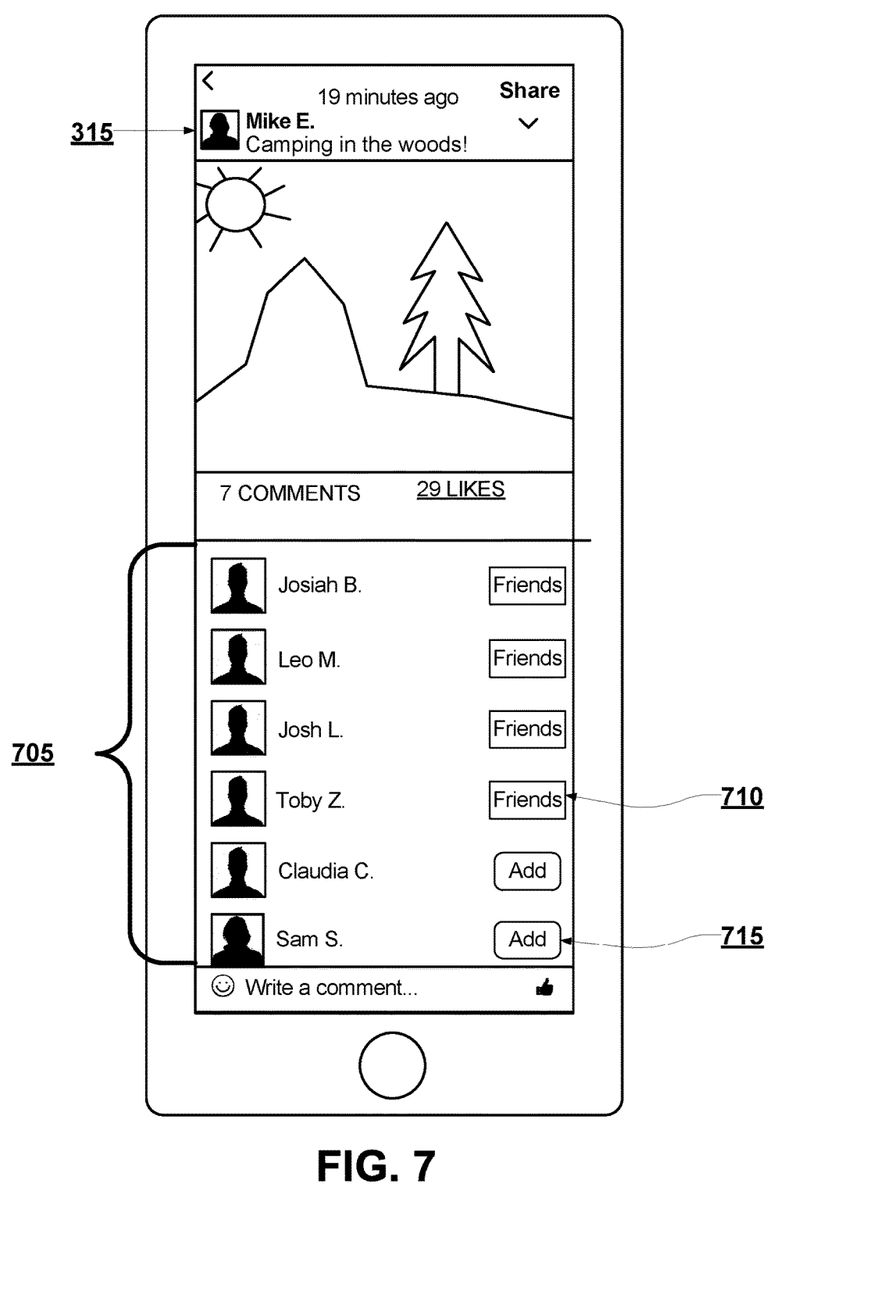
FIG. 7 illustrates an example user interface after the user selected an icon on a page for a content item, according to some embodiments.

FIG. 7 illustrates an example user interface after the user selected an icon 505 associated with a user liking the content item, according to some embodiments. Other users who have liked content item 315 are displayed 705. In some embodiments, a user can select one of the users presented 705 to see a profile page associated with the user. Information is also displayed about whether the viewing user is connected with the user 710. If not, the user interface provides an interface allowing the viewing user to send a friend request to the user 715.

Figure 8:
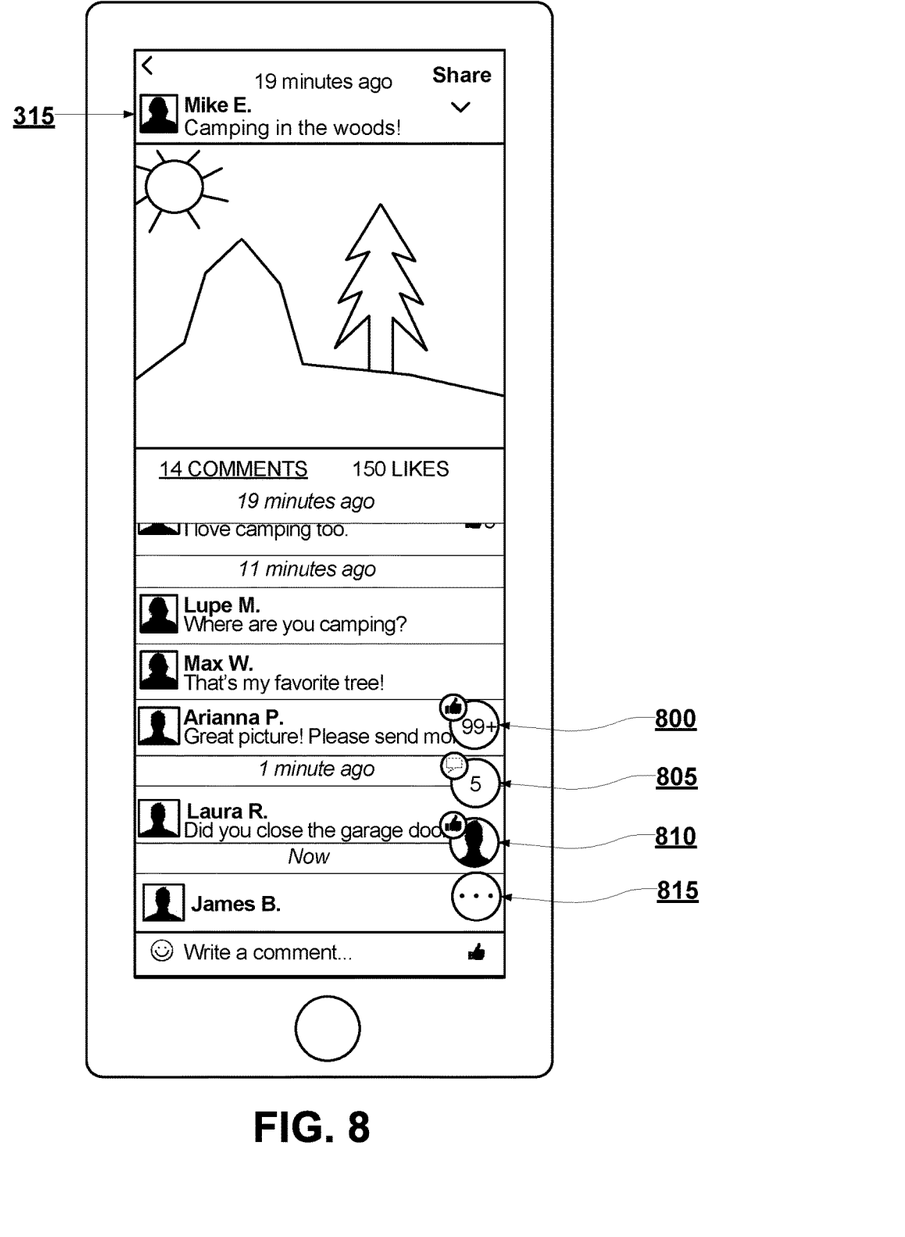
FIG. 8 illustrates an example user interface with an icon showing aggregated interactions and a pending interaction with content on a social networking system, according to some embodiments.

FIG. 8 illustrates an example user interface with an icon showing aggregated interactions and a pending interaction with content on a social networking system, according to some embodiments.

In some embodiments, if a content item 315 receives many interactions of the same type within a given time period, the social networking system aggregates the interactions into one icon. For example, the user interface illustrated in FIG. 8. shows 121 likes aggregated into one icon 800 and five comments aggregated into another icon 805. In some embodiments, a threshold number of interactions is needed to display an aggregated icon. For example, the social network may require five interactions to occur in order to display an aggregated icon; otherwise, individual icons may be shown. The aggregated icon shows a count of the number of interactions associated with the icon. In some embodiments, the displayed count does not exceed a certain value. For example, icon 800 shows "99+" to represent the 121 likes associated with the icon 800.

In some embodiments, the time period used to determine whether to aggregate interactions is the same as one deciding how long to display the icon. In other words, if an interaction occurs before the icon disappears, then an aggregated icon is displayed. In some embodiments, if an aggregated icon disappears and a new interaction occurs, an aggregated icon is displayed with the count including the interactions described by the aggregated icon that disappeared. In other embodiments, if an aggregated icon disappears and a new interaction occurs, an icon describing only the new interaction is displayed. In some embodiments, the viewing user can select an aggregated icon to view all interactions associated with the icon or to display the most recent interaction.

The aggregated icon may also show information about some of the users whose interactions are associated with the icon. For example, the aggregated icon may show the profile picture of users whose interactions are associated with the aggregated icon. In some embodiments, an icon 810 for an interaction performed by a user is displayed separate from an aggregated icon of interactions of the same type as the one performed by the user based on a measure of affinity of the viewing user for the interaction. For example, if the viewing user and the user who performed the interaction are connected in the social networking system, an icon for the interaction performed by the user connected to the viewing user may be displayed separate from an icon with an aggregation of interactions.

In some embodiments, a pending icon 815 showing a pending interaction is displayed to the viewing user. The pending icon 815 may be displayed while a user is typing the text for a comment. In some embodiments, the social networking system delays displaying a comment or other interaction with the content item 315 and instead displays the pending icon 815 to simulate that the user is in the process of performing the interaction. In some embodiments, the pending icon 815 contains information about the user performing the action e.g. the user's profile picture, or information about the type of interaction being performed.

Thus, the embodiments described here present notifications or icons to viewing users about their connections in the social networking system that are currently interacting with or just interacted with the content item, and the icons appear to the viewing user as the viewing user is viewing the content item. For example, the connection may have just interacted with the content item 1 second ago, 2 seconds ago, 3 seconds ago, 5 seconds ago, 20 seconds ago, 1 minute ago, 5 minutes ago, and so forth, or may have interacted with the content item some period of time ago that is less than a threshold period of time considered to be an immediately recent or substantially contemporaneous interaction. As the viewing user is viewing the content item, new icons can be appearing over time such that the viewing user has new notifications of each user that just interacted with the content item while the viewing user is viewing the content item. In this manner, the viewing user is getting a constant stream of real time notifications popping up as the user scrolls through his newsfeed. This allows the user to be aware of and immediately respond to another user who just commented on or liked a content item.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
presenting a content item amongst a plurality of content items in a first newsfeed displayed on a page to a first user of a social networking system;
receiving, from the first user, an interaction with the content item, the interaction having a first interaction type;
responsive to receiving the interaction:
selecting a second user of the social networking system, different from the first user, that is currently viewing the content item in a second newsfeed displayed on a page to the second user, the second user connected to the first user within the social networking system,
determining a measure of affinity of the first user for the second user, and
responsive to determining that the measure of affinity of the first user for the second user is greater than a threshold, generating a first icon for the second user, the first icon including a notification that the first user interacted with the content item in the first newsfeed, the first icon comprising information identifying the first interaction type;
identifying a set of interactions of the first interaction type performed by a set of additional users not containing the second user;
determining a measure of affinity of each of the set of additional users for the second user;
generating an aggregated icon displaying a count of a number of interactions in the set of interactions of the first interaction type performed by the set of additional users that each corresponds to a measure of affinity lower than the threshold; and
while the second user is currently viewing the content item in the second newsfeed, presenting the aggregated icon and the first icon to the second user in the second newsfeed such that the aggregated icon and the first icon appear to the second user as the second user is viewing the content item, the appearance of the aggregated icon and the first icon providing new notifications to the second user that the set of additional users and the first user interacted with the content item within a time threshold.

2. The method of claim 1, further comprising:
receiving, from the second user, an interaction with the first icon; and
presenting, to the second user, a page in the social networking system for the content item, the page comprising the interaction of the first interaction type with the content item received from the first user.

3. The method of claim 1, wherein the interaction with the content item comprises at least one of: the first user liking the content item; the first user posting a comment on the content item; the first user interacting with a comment posted on the content item; and the first user sharing the content item with other users of the social networking system.

4. The method of claim 1, wherein the first icon comprises information identifying the first user.

5. The method of claim 4, wherein the information identifying the first user comprises a profile picture for the first user.

6. The method of claim 1, wherein the aggregated icon comprises information identifying the set of additional users.

7. The method of claim 1, further comprising presenting, to the second user, a pending icon informing the user that an interaction is pending.

8. The method of claim 1, wherein the second user is selected based on a measure of affinity of the second user for the interaction from the first user having the first interaction type.

9. The method of claim 8, wherein the second user is selected based on a threshold for the measure of affinity of the second user for the interaction from the first user having the first interaction type.

10. The method of claim 1, further comprising:
selecting a third user based on the third user presently viewing a page in the social networking system for the content item;
generating a second icon comprising information identifying the third user;
presenting the second icon to the second user.

11. The method of claim 10, wherein the third user is selected based on a measure of affinity of the second user for the third user.

12. A non-transitory computer-readable storage medium storing computer program instructions to perform steps comprising:
presenting a content item amongst a plurality of content items in a first newsfeed displayed on a page to a first user of a social networking system;
receiving, from the first user, an interaction with the content item, the interaction having a first interaction type;
responsive to receiving the interaction:
selecting a second user of the social networking system, different from the first user, that is currently viewing the content item in a second newsfeed displayed on a page to the second user, the second user connected to the first user within the social networking system,
determining a measure of affinity of the first user for the second user, and
responsive to determining that the measure of affinity of the first user for the second user is greater than a threshold, generating a first icon for the second user, the first icon including a notification that the first user interacted with the content item in the first newsfeed, the first icon comprising information identifying the first interaction type;
identifying a set of interactions of the first interaction type performed by a set of additional users not containing the second user;
determining a measure of affinity of each of the set of additional users for the second user;
generating an aggregated icon displaying a count of a number of interactions in the set of interactions of the first interaction type performed by the set of additional users that each corresponds to a measure of affinity lower than the threshold; and
while the second user is currently viewing the content item in the second newsfeed, presenting the aggregated icon and the first icon to the second user in the second newsfeed such that the aggregated icon and the first icon appear to the second user as the second user is viewing the content item, the appearance of the aggregated icon and the first icon providing new notifications to the second user that the set of additional users and the first user interacted with the content item within a time threshold.

13. A non-transitory computer-readable storage medium of claim 12, wherein the interaction with the content item comprises at least one of: the first user liking the content item; the first user posting a comment on the content item; the first user interacting with a comment posted on the content item; and the first user sharing the content item with other users of the social networking system.

14. A non-transitory computer-readable storage medium of claim 12, the computer program instructions further executable to perform steps comprising presenting, to the second user, a pending icon informing the user that an interaction is pending.

15. A method comprising:
  presenting a content item amongst a plurality of content items in different newsfeeds displayed to a plurality of users of a social networking system;
  receiving, from each of the plurality of users, interactions with the content items, the interactions each having an interaction type; and
  responsive to receiving the interactions:
    selecting a viewing user of the social networking system, different from the plurality of users, the viewing user connected to the plurality of users within the social networking system,
    determining a measure of affinity for each of the plurality of users for the viewing user,
    responsive to determining that the measure of affinity of a subset of the plurality of users is greater than a threshold, generating a plurality of icons for the viewing user, each icon including a notification that one of the users in the subset of the plurality of users interacted with the content item, the icon comprising information identifying the type of the interaction, and
    responsive to determining that the measure of affinity of another subset of the plurality of users is less than the threshold, generating a plurality of aggregated icons, each aggregated icon displaying a count of a number of interactions of an interaction type performed by the other subset of the plurality of users;
    presenting the plurality of icons to the viewing user, each of the icons appearing to the viewing user such that the viewing user continues to receive new notifications of interactions with the content item by the subset of the plurality of users as those interactions are occurring;
    presenting the plurality of aggregated icons to the viewing user, each of the aggregated icons appearing to the viewing user such that the viewing user continues to receive updated notifications of the counts of the number of interactions by other subset of the plurality of users as those interactions are occurring.

16. The method of claim 15, wherein the plurality of icons are presented at locations on a scroll bar, the location of each icon on the scroll bar representing a location in a newsfeed of a content item associated with the icon.

17. The method of claim 15, wherein the plurality of icons are presented on pages in the social networking system for content items.

\* \* \* \* \*

UNITED STATES PATENT AND TRADEMARK OFFICE
CERTIFICATE OF CORRECTION

PATENT NO. : 10,303,332 B2
APPLICATION NO. : 15/243913
DATED : May 28, 2019
INVENTOR(S) : Clediere et al.

It is certified that error appears in the above-identified patent and that said Letters Patent is hereby corrected as shown below:

In the Claims

In Column 15, Claim 13, Line 1, delete "A" and insert -- The --, therefor.

In Column 15, Claim 14, Line 8, delete "A" and insert -- The --, therefor.

Signed and Sealed this
Eighth Day of October, 2019

Andrei Iancu
*Director of the United States Patent and Trademark Office*